United States Patent [19]

Bourassa

[11] Patent Number: 5,579,939

[45] Date of Patent: Dec. 3, 1996

[54] ELECTRICAL DEVICE BOX

[75] Inventor: Alain Bourassa, Laval, Canada

[73] Assignee: Temco Electric Products Company Inc., Montreal, Canada

[21] Appl. No.: 511,521

[22] Filed: Aug. 4, 1995

[30] Foreign Application Priority Data

Dec. 28, 1994 [CA] Canada ................................. 2139172

[51] Int. Cl.⁶ ..................................................... H02G 3/00
[52] U.S. Cl. .............................. 220/3.3; 220/3.5; 220/3.9
[58] Field of Search ................................. 220/3.3, 3.5, 3.9

[56] References Cited

U.S. PATENT DOCUMENTS

| | | | |
|---|---|---|---|
| 2,611,501 | 9/1952 | Bermann | 220/3.5 X |
| 2,738,894 | 3/1956 | Cook et al. | 220/3.3 |
| 2,757,817 | 8/1956 | Egan | 220/3.5 |
| 2,809,763 | 10/1957 | Clark | 220/3.9 |
| 3,127,145 | 3/1964 | McGinty et al. | 220/3.9 X |
| 3,428,284 | 2/1969 | Trachtenberg et al. | 220/3.9 X |
| 3,684,230 | 8/1972 | Swanquist . | |
| 3,730,466 | 5/1973 | Swanquist | 248/216 |
| 4,723,746 | 2/1988 | Gould et al. | 248/205 |
| 4,842,156 | 6/1989 | Nattel | 220/3.9 |

*Primary Examiner*—Steven M. Pollard
*Attorney, Agent, or Firm*—Darby & Darby, P.C.

[57] ABSTRACT

The electrical device box comprises four side walls and a rear wall, each side wall being connected to an adjacent side wall and to the rear wall for defining a generally rectangular housing having a front opening delimited by an edge. The box comprises a set of first tabs outwardly projecting from one of the side walls which is to be set against a side of an adjacent supporting structure. The first tabs are spaced apart and at an equal distance from the edge of the front opening for providing alignment of the box with a front surface of the supporting structure. The box also comprises a set of second tabs outwardly projecting from the same side wall. The second tabs are spaced-apart and at an equal distance from the edge of the front opening but farther from it than the first tabs. The second tabs have a sharp end for either penetrating the side of the supporting structure in case of an integral supporting structure, or providing alignment of the box with an intermediate surface between elements in case of a composite supporting structure. The present box is more versatile than the precedent ones.

9 Claims, 4 Drawing Sheets

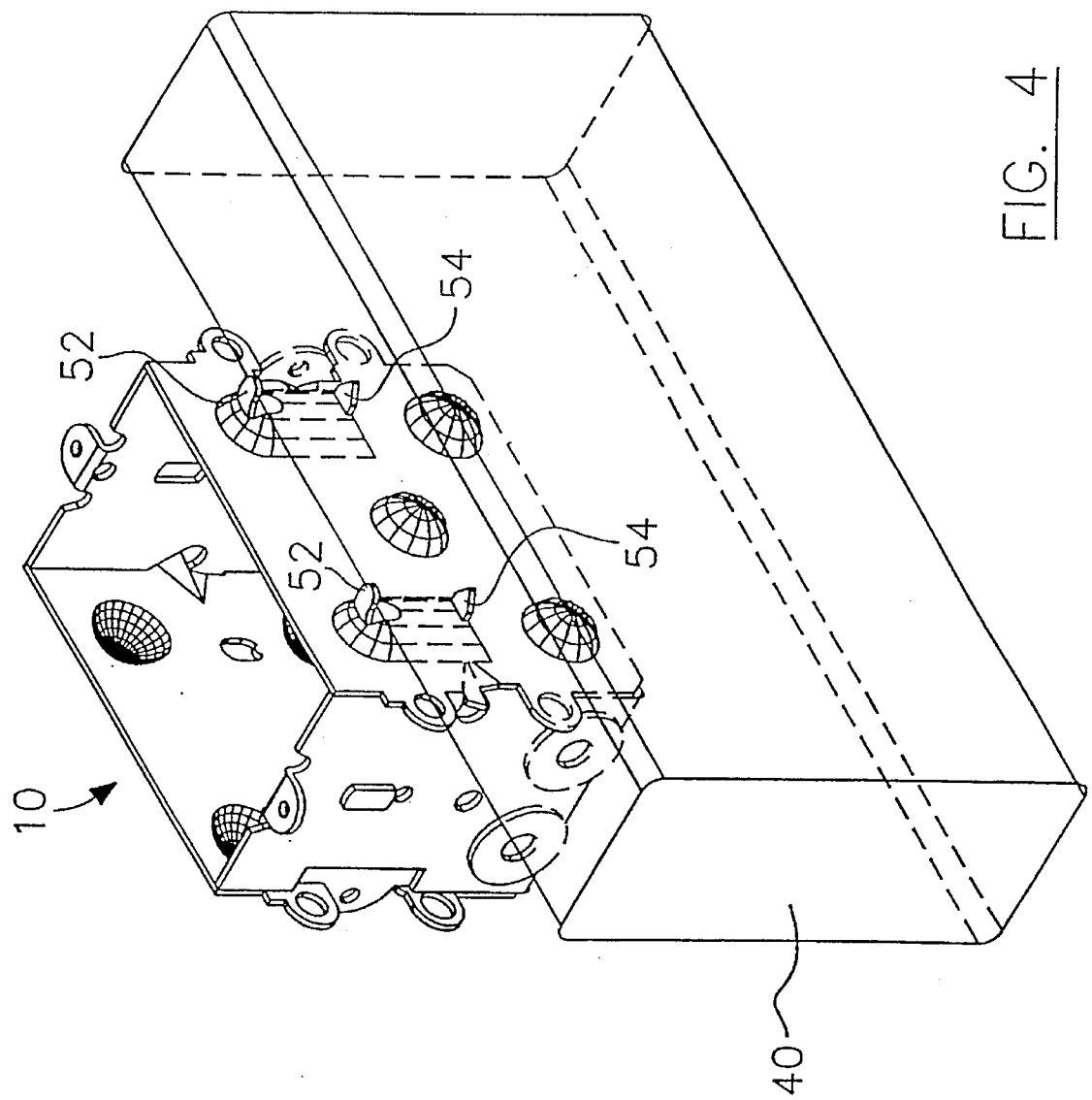

ELECTRICAL DEVICE BOX

FIELD OF THE INVENTION

The present invention relates to an improvement to the structure of a conventional electrical device box. The electrical device box is a generic term for boxes such as electrical outlet boxes, electrical wiring boxes or any similar box used for installing electrical equipments and connections, especially into a building or dwelling.

BACKGROUND OF THE INVENTION

Electrical device boxes are extensively used buildings and dwellings. Such boxes, usually made of metal, are fixed to a supporting structure such as the lateral side of a wood stud or the like.

It is a common practice to provide the boxes with side tabs outwardly projecting therefrom to form some kind of stop means that can be used to align the box with respect to a front surface of the supporting structure. However, no such box was versatile enough to be used either with a stud, or with a stud covered by a furring or by a similar element.

SUMMARY OF THE INVENTION

The object of the present invention is to provide an electrical device box which is versatile enough to be used either with a stud, or with a stud covered by a furring or by a similar element.

In accordance with the invention, this object is achieved with an electrical device box comprising:

four side walls and a rear wall, each side wall being connected to an adjacent side wall and to the rear wall for defining a generally rectangular housing having a front opening delimited by an edge;

a set of first tabs outwardly projecting from one of the side walls which is to be set against a side of an adjacent supporting structure, the first tabs being spaced apart and at an equal distance from the edge of the front opening for providing alignment of the box with a front surface of the supporting structure; and a set of second tabs outwardly projecting from the side wall provided with the first tabs, the second tabs being spaced apart and at an equal distance from the edge of the front opening but farther from it than the first tabs, the second tabs having a sharp end for either penetrating the side of the supporting structure in case of an integral supporting structure, or providing alignment of the box with an intermediate surface between elements in case of a composite supporting structure.

In accordance with the invention, the object may still be achieved with an electrical device box comprising:

four side walls and a rear wall, each side wall being connected to an adjacent side wall and to the rear wall for defining a generally rectangular housing having a front opening delimited by an edge;

at least three bumps outwardly projecting from one of the side walls which is to be set against a side of an adjacent supporting structure, the bumps defining a resting plane substantially parallel to the corresponding side wall;

a set of first tabs outwardly projecting from the side wall provided with the bumps, the first tabs being spaced apart and at an equal distance from the edge of the front opening, the first tabs having a height extending above the resting plane for providing alignment of the box with a front surface of the supporting structure; and a set of second tabs outwardly projecting from the side wall provided with the bumps and the first tabs, the second tabs being spaced apart and at an equal distance from the edge of the front opening but farther from it than the first tabs, the second tabs having a sharp end and a height extending above the resting plane for either penetrating the side of the supporting structure in case of an integral supporting structure, or providing alignment of the box with an intermediate surface between elements in case of a composite supporting structure.

In accordance with the invention, the object may still be achieved with an electrical device box comprising:

four side walls and a rear wall, each side wall being connected to an adjacent side wall and to the rear wall for defining a generally rectangular housing having a front opening delimited by an edge;

three hemispherical bumps outwardly projecting from one of the side walls which is to be set against a side of an adjacent supporting structure, the bumps defining a resting plane substantially parallel to the corresponding side wall;

two spaced-apart substantially oblong bumps outwardly projecting from the side wall provided with the hemispherical bumps, each oblong bump having one end adjacent to the edge of the front opening;

two first tabs, each outwardly projecting from and punched out of a corresponding oblong bump, the first tabs being at an equal distance from the edge of the front opening, the first tabs having a height extending above the resting plane for providing alignment of the box with an outward surface of the supporting structure, the distance between each of the first tabs and the edge of the front opening being substantially equal to a drywall thickness; and two second tabs, each outwardly projecting from and punched out of a corresponding oblong bump, the second tabs being at an equal distance from the edge of the front opening but farther from it than the first tabs, the second tabs having a sharp end and a height extending above the resting plane for either penetrating the side of the supporting structure in case of an integral supporting structure, or providing alignment of the box with an intermediate surface between elements in case of a composite supporting structure.

A non restrictive description of a preferred embodiment will now be given with reference to the appended drawings.

BRIEF DESCRIPTION OF THE DRAWINGS

FIG. 4 is a front perspective view of the box shown in FIG. 1, which is fixed to an adjacent integral supporting structure comprising a stud.

DESCRIPTION OF A PREFERRED EMBODIMENT

Figure 1:
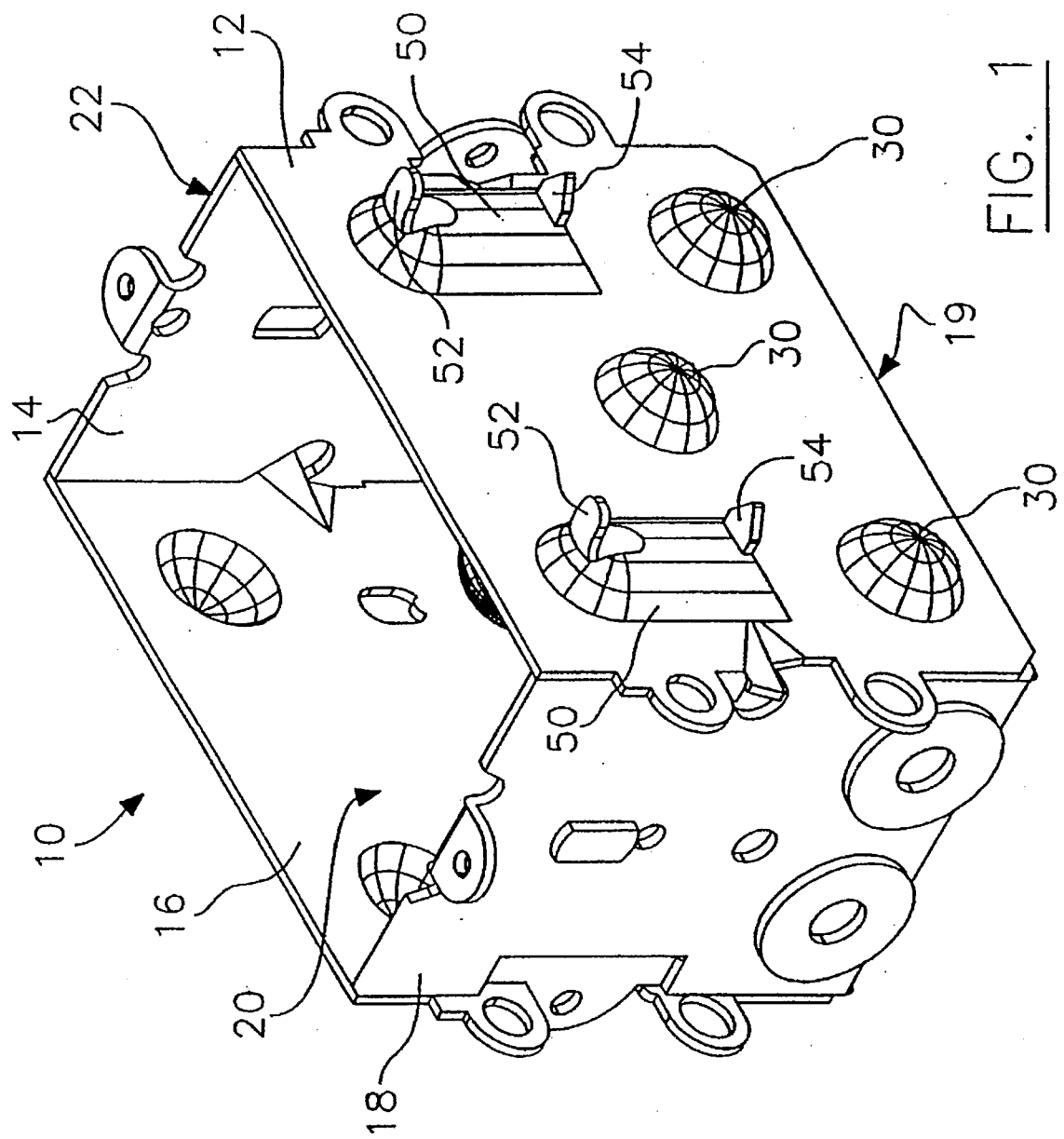
FIG. 1 is a front perspective view of the electrical device box according to a preferred embodiment of the present invention.

The electrical device box (10) is usually made of metal, although other materials such as plastic are also suitable. It basically comprises four side walls (12,14,16,18) and a rear wall (19). Each side wall is connected to an adjacent side wall and to the rear wall (19) for defining a generally rectangular housing having a front opening (20) delimited by a front edge (22).

In one possible embodiment, there are provided at least three hemispherical bumps (30) outwardly projecting from one of the side walls. Similar bumps may also be provided on other side walls. The present side wall (12) is designed to be set against a side of an adjacent supporting structure, such as the ones in FIGS. 4 and 5. It should be also possible to provide no bumps (30) and resting the side wall (12) directly on the supporting member if necessary. Additionally, the bumps (30) may have another shape than hemispherical. The peaks of the bumps (30) are defining together a resting plane substantially parallel to the side wall (12).

It is possible to further provide two spaced-apart oblong bumps (50) outwardly projecting from the side wall (12). The oblong bumps (50) are perpendicular to the edge (22) and have an end which is adjacent thereto. Each oblong bump (50) bears one of the first tabs (52), each outwardly projecting from and punched out of it. The first tabs (52) are at an equal distance from the edge (22) for ensuring proper alignment of the box (10). Alternatively, the box (10) may be provided without oblong bumps (50) and the first tabs (52) are then punched out of the side wall (12) directly.

Figure 5:
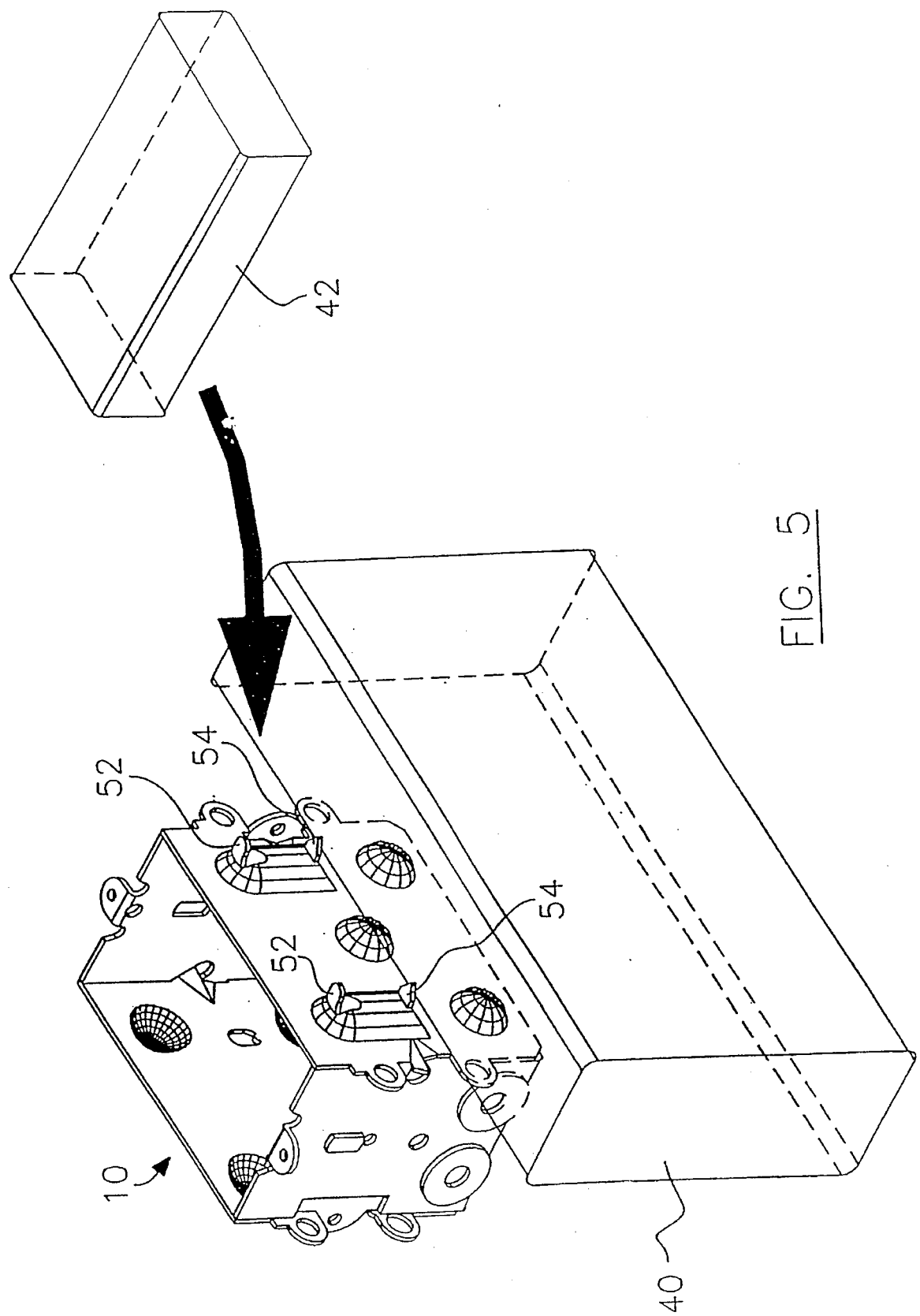
FIG. 5 is a front perspective view of the box shown in FIG. 1, which is fixed to an adjacent composite supporting structure comprising a stud and a furring.

The height of the first tabs (52) has to extend above the resting plane. Once in place, the first tabs (52) are provide alignment of the box (10) with the outward surface of the supporting structure, as shown in FIGS. 4 and 5. By setting the distance between each of the first tabs (52) and the edge (22) substantially equal to a drywall thickness, it is possible to install the box (10) long before the drywall and still have the box (10) at the right location.

The present invention also provides a set of second tabs (54), each outwardly projecting from and punched out of a corresponding oblong bump (50) under its first tab (52). The second tabs (54) are at an equal distance from the edge (22) but farther from it than the first tabs (52).

Because of their particular position, the second tabs (54) have a sharp end. If the bumps (30) are present, the height of the second tabs (54) extend above the resting plane. The second tabs (54) may then either penetrate the side of the stud (40) in case of an integral supporting structure, as shown in FIG. 4, or providing alignment of the box (10) with an intermediate surface between the elements in case of a composite supporting structure, such as a stud (40) and furring (42) composite supporting structure 42 shown in FIG. 5.

Figure 3:
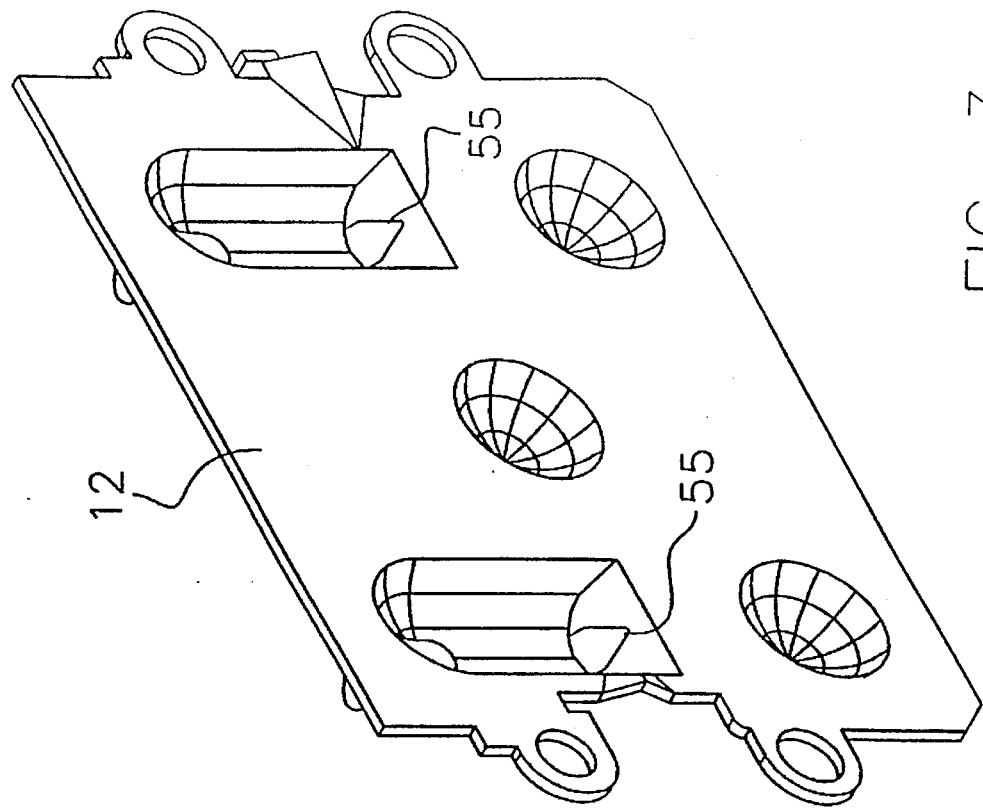
FIG. 3 is an inside perspective view of the side wall shown in FIG. 2.
Figure 2:
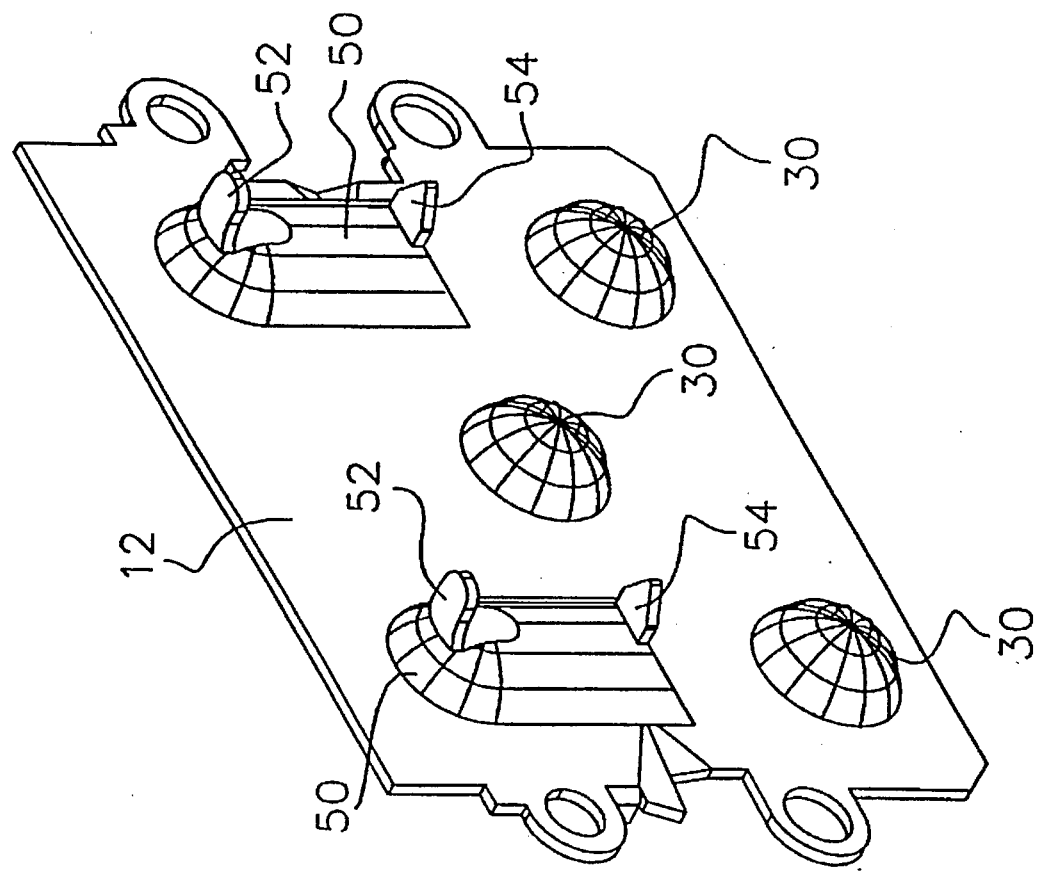
FIG. 2 is an outside perspective view of the right side wall of the box shown in FIG. 1.

As it can be understood, the second tabs (54) may also be punched out of the side wall (12) directly. When used with an integral supporting structure such as the stud (40) shown in FIG. 4, the sharp end of the second tabs (54) penetrates the stud (40) and holds the box (10) in place until one or more screws or nails are used. Among the holes in which the screws or nails can be inserted, there are holes left by the punching of the first and second tabs (52,54) which are very convenient, especially the holes (55), shown in FIG. 3, left by the second tabs (54) in an optional inclined flat end of the oblong bumps (50). Preferably, the flat ends are inclined of 45°.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

The embodiments of the invention in which an exclusive property or privilege is claimed are defined as follows:

1. An electrical device box comprising:
    four side walls and a rear wall, each side wall being connected to an adjacent side wall and to the rear wall for defining a generally rectangular housing having a front opening delimited by an edge;
    at least three bumps outwardly projecting from one of the side walls which is to be set against a side of an adjacent supporting structure, the bumps defining a resting plane substantially parallel to the corresponding side wall;
    a set of first tabs outwardly projecting from the side wall provided with the bumps, the first tabs being spaced apart and at an equal distance from the edge of the front opening, the first tabs having a height extending above the resting plane for providing alignment of the box with a front surface of the supporting structure;
    a set of second tabs outwardly projecting from the side wall provided with the bumps and the first tabs, the second tabs being spaced apart and at an equal distance from the edge of the front opening but farther from it than the first tabs, the second tabs having a sharp end and a height extending above the resting plane for either penetrating the side of the supporting structure in case of an integral supporting structure, or providing alignment of the box with an intermediate surface between elements in case of a composite supporting structure; and
    substantially oblong bumps wherein:
        said first and second tabs are provided in pairs, the tabs of each pair being aligned with each other; and
        said first and second tabs are punched out of the oblong bumps.

2. An electrical device box according to claim 4, wherein the first and second tabs are punched out of the corresponding side wall.

3. An electrical device box according to claim 2, wherein the distance between each of the first tabs and the edge of the front opening is substantially equal to a drywall thickness.

4. An electrical device box according to claim 1, wherein the bumps are substantially hemispherical and are three in number.

5. An electrical device box according to claim 1, wherein the pairs are two in number.

6. An electrical device box according to claim 1, wherein the oblong bumps have a flat inclined end opposite the edge of the front opening, each of the second tabs being punched out of a respective flat end for leaving an inclined opening through which a fastening means is insertable for holding the box to the supporting structure.

7. An electrical device box according to claim 1, wherein the distance between each of the first tabs and the edge of the front opening is substantially equal to a drywall thickness.

8. An electrical device box comprising:
    four side walls and a rear wall, each side wall being connected to an adjacent side wall and to the rear wall for defining a generally rectangular housing having a front opening delimited by an edge;
    three hemispherical bumps outwardly projecting from one of the side walls which is to be set against a side of an adjacent supporting structure, the bumps defining a resting plane substantially parallel to the corresponding side wall;

two spaced-apart substantially oblong bumps outwardly projecting from the side wall provided with the hemispherical bumps, each oblong bump having one end and adjacent to the edge of the front opening;

two first tabs, each outwardly projecting from and punched out of a corresponding oblong bump, the first tabs being at an equal distance from the edge of the front opening, the first tabs having a height extending above the resting plane for providing alignment of the box with a front surface of the supporting structure, the distance between each of the first tabs and the edge of the front opening being substantially equal to a drywall thickness; and two second tabs, each outwardly projecting from and punched out of a corresponding oblong bump, the second tabs being at an equal distance from the edge of the front opening but farther from it than the first tabs, the second tabs having a sharp end and a height extending above the resting plane for either penetrating the side of the supporting structure in case of an integral supporting structure, or providing alignment of the box with an intermediate surface between elements in case of a composite supporting structure.

9. An electrical device box according to claim 8, wherein the oblong bumps have a flat inclined end opposite the edge of the front opening, each of the second tabs being punched out of a respective flat end for leaving an inclined opening through which a fastening means is insertable for holding the box to the supporting structure.

* * * * *